US009692770B2

(12) United States Patent
Ike et al.

(10) Patent No.: US 9,692,770 B2
(45) Date of Patent: Jun. 27, 2017

(54) SIGNATURE VERIFICATION USING UNIDIRECTIONAL FUNCTION

(71) Applicant: Panasonic Intellectual Property Management Co., Ltd., Osaka (JP)

(72) Inventors: Kenjiro Ike, Fukuoka (JP); Saburo Toyonaga, Fukuoka (JP); Hiroyuki Tanaka, Fukuoka (JP); Masakatsu Matsuo, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/712,704

(22) Filed: May 14, 2015

(65) Prior Publication Data

US 2015/0350197 A1 Dec. 3, 2015

(30) Foreign Application Priority Data

May 27, 2014 (JP) ................................. 2014-108866

(51) Int. Cl.
*H04L 29/06* (2006.01)
(52) U.S. Cl.
CPC ........ *H04L 63/126* (2013.01); *H04L 63/0442* (2013.01)
(58) Field of Classification Search
CPC ............. H04L 63/0823; H04L 63/0876; H04L 63/1416
USPC ........................................ 713/151, 154, 156
See application file for complete search history.

(56) References Cited

U.S. PATENT DOCUMENTS

| 6,085,320 A | 7/2000 | Kaliski, Jr. |
| 6,189,098 B1 | 2/2001 | Kaliski, Jr. |
| 6,253,322 B1 | 6/2001 | Susaki et al. |

(Continued)

FOREIGN PATENT DOCUMENTS

| JP | 09-305661 A | 11/1997 |
| JP | 10-327147 A | 12/1998 |

(Continued)

*Primary Examiner* — Haresh N Patel
(74) *Attorney, Agent, or Firm* — Seed IP Law Group LLP

(57) ABSTRACT

Provided is a signature verification system including a communication device and a verification device. The communication device and the verification device are connected to each other through a network. The communication device derives a first hash value from a first random number, derives a second hash value from data including electronic data and a certificate of the communication device which includes the first hash value and a public key of the communication device, using a unidirectional function, generates a signature using a secret key of the communication device with respect to the second hash value, and transmits the electronic data, the certificate, and the signature to the verification device. The verification device receives the electronic data, the certificate, and the signature, authenticates the communication device using the first hash value included in the certificate, derives the second hash value from the data including the electronic data and the certificate using a unidirectional function, and verifies the signature using the public key of the communication device and the derived second hash value which are included in the certificate.

10 Claims, 8 Drawing Sheets

(56) References Cited

U.S. PATENT DOCUMENTS

| | | | | |
|---|---|---|---|---|
| 9,374,368 B1* | 6/2016 | Roth | ...................... | H04L 63/123 |
| | | | | 713/181 |
| 2005/0193192 A1 | 9/2005 | Sakazaki et al. | | |
| 2008/0046758 A1* | 2/2008 | Cha | ........................ | G06F 21/57 |
| | | | | 713/189 |
| 2010/0174911 A1* | 7/2010 | Isshiki | ..................... | G06F 21/31 |
| | | | | 713/182 |
| 2012/0060028 A1* | 3/2012 | Furukawa | ............. | H04L 9/3218 |
| | | | | 713/156 |
| 2013/0073845 A1* | 3/2013 | Teranishi | .............. | H04L 9/3255 |
| | | | | 713/156 |
| 2013/0262626 A1* | 10/2013 | Bozek | ..................... | H04L 67/10 |
| | | | | 709/217 |
| 2014/0122888 A1* | 5/2014 | Yoon | ..................... | H04L 9/0844 |
| | | | | 713/171 |
| 2015/0088982 A1* | 3/2015 | Johnson | .................. | H04L 67/34 |
| | | | | 709/203 |
| 2015/0113172 A1* | 4/2015 | Johnson | .................. | H04L 67/34 |
| | | | | 709/245 |
| 2015/0373048 A1* | 12/2015 | Siddiqui | ............... | H04W 12/08 |
| | | | | 713/151 |
| 2016/0044497 A1* | 2/2016 | Soini | ....................... | H04W 8/22 |
| | | | | 455/419 |
| 2016/0087933 A1* | 3/2016 | Johnson | ................ | H04W 4/001 |
| | | | | 709/245 |
| 2016/0092339 A1* | 3/2016 | Straub | ..................... | H04L 67/26 |
| | | | | 717/124 |
| 2016/0092348 A1* | 3/2016 | Straub | ................. | G06F 11/3684 |
| | | | | 717/124 |
| 2016/0094560 A1* | 3/2016 | Stuntebeck | ........... | H04L 63/102 |
| | | | | 726/1 |

FOREIGN PATENT DOCUMENTS

| | | |
|---|---|---|
| JP | 11-003033 A | 1/1999 |
| JP | 2005-252318 A | 9/2005 |

* cited by examiner

SIGNATURE VERIFICATION USING UNIDIRECTIONAL FUNCTION

BACKGROUND OF THE INVENTION

1. Field of the Invention

The present invention relates to a signature verification system, a communication device, a verification device, a signature generation method, and a signature verification method.

2. Description of the Related Art

Hitherto, it has been known that a digital signature and a digital certificate for verifying the digital signature are given to recorded electronic data in order to certify that the electronic data is not altered. The digital signature is also simply referred to as a "signature", and the digital certificate is also simply referred to as a "certificate".

For example, Japanese Patent Unexamined Publication No. 9-305661 discloses a source authentication method in which two devices authenticate the source of electronic data by using the respective certificates signed by the same certificate authority, as a method of verifying the effectiveness of electronic data.

For example, Japanese Patent Unexamined Publication No. 2005-252318 discloses the following electronic certificate effectiveness confirmation system as a system for verifying a signature given to electronic data. In the electronic certificate effectiveness confirmation system, a transmission source of the electronic data obtains effectiveness confirmation information from a certificate authority as a third party other than the transmission source and a transmission destination of the electronic data, and transmits the effectiveness confirmation information to the transmission destination of the electronic data.

In techniques disclosed in Japanese Patent Unexamined Publication No. 9-305661 and Japanese Patent Unexamined Publication No. 2005-252318, it is difficult to verify the validity of the signature attached to the electronic data at a low cost.

SUMMARY OF THE INVENTION

The present invention is contrived in view of the above-mentioned situations, and an object thereof is to provide a signature verification system, a communication device, a verification device, a signature generation method, and a signature verification method which are capable of verifying the validity of a signature attached to electronic data at a low cost.

According to an aspect of the present invention, there is provided a signature verification system including a communication device, and a verification device. The communication device and the verification device are connected to each other through a network. The communication device includes a first random number generation unit that generates a first random number, a first unidirectional function processing unit that derives a first hash value from the first random number using a unidirectional function, a public key pair generation unit that generates a secret key and a public key of the communication device, a second unidirectional function processing unit that derives a second hash value from data including electronic data and a certificate of the communication device, which includes the first hash value and the public key of the communication device, using a unidirectional function, a signature generation unit that generates a signature using the secret key of the communication device with respect to the second hash value, and a first communication unit that transmits the electronic data, the certificate, and the signature to the verification device. The verification device includes a second communication unit that receives the electronic data, the certificate, and the signature from the communication device, an authentication processing unit that authenticates the communication device using the first hash value included in the certificate, a third unidirectional function processing unit that derives the second hash value from the data including the electronic data and the certificate, using a unidirectional function, and a signature verification unit that verifies the signature using the public key of the communication device and the derived second hash value which are included in the certificate.

According to another aspect of the present invention, there is provided a communication device which is connected to a verification device through a network. The communication device includes a random number generation unit that generates a first random number; a first unidirectional function processing unit that derives a first hash value from the first random number using a unidirectional function; a public key pair generation unit that generates a secret key and a public key of the communication device; a second unidirectional function processing unit that derives a second hash value from data including electronic data and a certificate of the communication device, which includes the first hash value and the public key of the communication device, using a unidirectional function; a signature generation unit that generates a signature using the secret key of the communication device with respect to the second hash value; and a communication unit that transmits the electronic data, the certificate, and the signature to the verification device.

According to still another aspect of the present invention, there is provided a verification device which is connected to a communication device through a network. The verification device includes a communication unit that receives, from the communication device, electronic data, a certificate of the communication device which includes a first hash value, derived from a random number generated by the communication device, and a public key of the communication device, and a signature generated using a secret key of the communication device with respect to a second hash value which is derived from data including the electronic data and the certificate using a unidirectional function; an authentication processing unit that authenticates the communication device using the first hash value included in the certificate; a unidirectional function processing unit that derives a second hash value from the data including the electronic data and the certificate using a unidirectional function; and a signature verification unit that verifies the signature using the public key of the communication device and the derived second hash value which are included in the certificate.

According to still another aspect of the present invention, there is provided a signature generation method in a communication device which is connected to a verification device through a network. The signature generation method includes a step of generating a first random number; a step of deriving a first hash value from the first random number using a unidirectional function; a step of generating a secret key and a public key of the communication device; a step of deriving a second hash value from data including electronic data and a certificate of the communication device which includes the first hash value and the public key of the communication device; and a step of generating a signature using the secret key of the communication device with respect to the second hash value.

According to still another aspect of the present invention, there is provided a signature verification method in a verification device which is connected to a communication device through a network. The signature verification method includes a step of authenticating the communication device using a first hash value, derived from a random number generated by the communication device, which is included in a certificate of the communication device which includes the first hash value and a public key of the communication device; a step of deriving a second hash value from data including electronic data and the certificate, using a unidirectional function; and a step of verifying a signature using the public key of the communication device and the derived second hash value which are included in the certificate. The signature is a signature which is generated by the communication device using a secret key of the communication device with respect to the second hash value derived from the data including the electronic data and the certificate.

According to the present invention, it is possible to verify the validity of a signature attached to electronic data at a low cost.

DETAILED DESCRIPTION OF THE PREFERRED EMBODIMENT

Hereinafter, an exemplary embodiment of the present invention will be described with reference to the accompanying drawings.

Background of Obtainment of Mode of the Present Invention

In recent years, commodities and systems that provide added value by connecting, for example, a multifunction machine, a camera, or a smart appliance (appliance connected to a network) to a network are increasing in number with the development of the Internet. A terminal connected to a network is called a network terminal.

For example, since it is easy to process or edit electronic data (for example, image data or sound data) which is recorded by a surveillance camera as a network terminal, the electronic data can be easily altered. Accordingly, there is the possibility of the electronic data having an insufficient evidential capacity in a trial and the like.

A signature and a certificate may be given to recorded electronic data in order to certify that the electronic data is not altered. In a signature system of the related art, it is difficult to certify at a low cost whether or not a signature and a certificate which are distributed from a transmission source of electronic data are actually generated by the transmission source. For example, when a third party writes a signature in the certificate attached to the electronic data using a reliable method, the cost is increased, and the processing time for signature verification is lengthened. For example, when a self-signature certificate signed by a transmission source is used as the certificate, there is a tendency for alteration and the like to occur, and thus the reliability of the signature is poor.

In the technique disclosed in Japanese Patent Unexamined Publication No. 9-305661, it is difficult to certify that the electronic data is not altered when the transmission destination of the electronic data does not hold a certificate even when the transmission source of the electronic data holds the certificate.

In the technique disclosed in Japanese Patent Unexamined Publication No. 2005-252318, it is necessary to communicate with a certificate authority as a third party other than the transmission source and the transmission destination of the electronic data. For this reason, the cost for verifying a signature is increased, and the processing time for the signature verification is lengthened.

Hereinafter, a description will be given of a signature verification system, a communication device, a verification device, a signature generation method, and a signature verification method which are capable of verifying the validity of a signature attached to electronic data at a low cost.

Exemplary Embodiment

Figure 1:
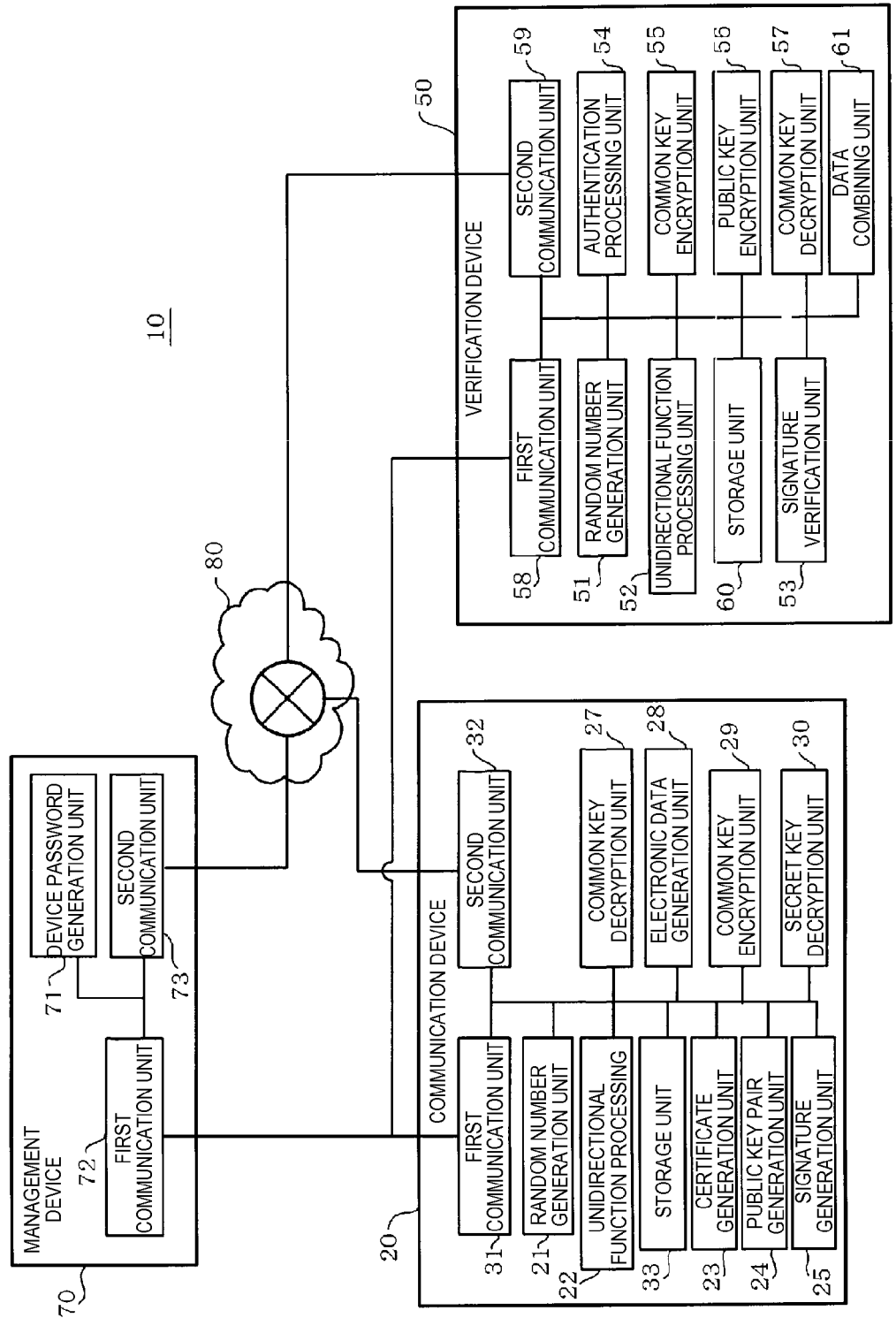
FIG. 1 is a block diagram illustrating a configuration example of a signature verification system according to an exemplary embodiment.

FIG. 1 is a block diagram illustrating a configuration example of signature verification system 10 according to an exemplary embodiment. Signature verification system 10 includes communication device 20 as a network terminal, verification device 50, and management device 70. Communication device 20, verification device 50, and management device 70 are connected to each other through Internet 80. Internet 80 is an example of a network.

Communication device 20 is, for example, a camera, a multifunction machine, a television, a smartphone, or a tablet terminal which is connected to a network. Communication device 20 includes random number generation unit 21, unidirectional function processing unit 22, certificate generation unit 23, public key pair generation unit 24, signature generation unit 25, common key decryption unit 27, electronic data generation unit 28, common key encryption unit 29, secret key decryption unit 30, first communication unit 31, second communication unit 32, and storage unit 33.

Random number generation unit 21 generates a random number. Random number generation unit 21 may generate a pseudo-random number using, for example, a general pseudo-random number generation algorithm, or may generate a genuine random number using random number generation hardware. Random number generation unit 21 is an example of a first random number generation unit.

Unidirectional function processing unit 22 generates a hash value from various pieces of data (for example, a random number) using, for example, a unidirectional function. Unidirectional function processing unit 22 is an example of a first unidirectional function processing unit or a second unidirectional function processing unit.

Certificate generation unit 23 writes a signature using a secret key of communication device 20 on the basis of, for example, information of a public key of communication device 20 to thereby generate a certificate of communication device 20.

Public key pair generation unit 24 generates a public key pair (a pair of a public key and a secret key) of communication device 20 using, for example, a random number.

Signature generation unit 25 generates a signature on the basis of a predetermined signature algorithm using, for example, the secret key of communication device 20. In this case, signature generation unit 25 encrypts predetermined data using the secret key of communication device 20. The signature algorithm includes, for example, a signature algorithm based on a combination of a public key encryption method and a hash function.

The signature algorithm includes, for example, RSA signature scheme with appendix (RSASSA)-public key cryptography standards (PKCS) 1 v1.5. The signature algorithm includes, for example, a probabilistic signature scheme (RSASSA-PSS). The signature algorithm includes, for example, a digital signature algorithm (DSA) or an elliptic curve DSA (ECDSA).

Common key decryption unit 27 decrypts encrypted data which is transmitted from verification device 50, using a common key shared with verification device 50. Common key decryption unit 27 is an example of a first data decryption unit.

Electronic data generation unit 28 creates electronic data which is required to secure an evidential property. The electronic data includes, for example, image data, sound data, or an access log of communication device 20. Electronic data generation unit 28 may combine the generated electronic data with another data.

Common key encryption unit 29 encrypts various pieces of data on the basis of a predetermined common key cryptographic algorithm (for example, advanced encryption standard (AES)) by using a common key. Common key encryption unit 29 is an example of a first data encryption unit.

Secret key decryption unit 30 decrypts encrypted data which is encrypted using the public key of communication device 20 in accordance with a predetermined public key algorithm by using the secret key of communication device 20. Secret key decryption unit 30 is an example of a first data decryption unit.

First communication unit 31 is used, for example, in a process of installing communication device 20 and communicates with management device 70. First communication unit 31 includes, for example, a serial interface (I/F) or a communication interface. The serial I/F includes, for example, recommended standard 232 version C (RS-232C). The communication interface includes, for example, a universal serial bus (USB) or Thunderbolt (registered trademark).

Second communication unit 32 includes an interface for communicating with verification device 50 through Internet 80. Second communication unit 32 includes, for example, a wired interface or a wireless interface. The wired interface includes, for example, a wired local area network (LAN) interface. The wireless interface includes, for example, Bluetooth (registered trademark) or a wireless LAN interface. Second communication unit 32 is an example of a first communication unit.

Storage unit 33 stores various pieces of data. Storage unit 33 stores, for example, the public key pair of communication device 20, a common key, and a public key of verification device 50. Storage unit 33 is an example of a first storage unit.

Communication device 20 includes, for example, a central processing unit (CPU), a read only memory (ROM), and a random access memory (RAM). For example, the CPU realizes various types of functions in units within communication device 20 by executing a program stored in the ROM.

Management device 70 includes device password generation unit 71, first communication unit 72, and second communication unit 73.

Device password generation unit 71 generates a device password. The device password is, for example, an arbitrary value. For example, the device password is set in communication device 20 and verification device 50 in the process of installing communication device 20.

First communication unit 72 is used in the process of installing communication device 20, and communicates with communication device 20 and verification device 50. First communication unit 72 includes, for example, a serial I/F or a communication interface. The serial I/F includes, for example, RS-232C. The communication interface includes, for example, a USB or Thunderbolt (registered trademark).

Second communication unit 73 includes an interface for communicating communication device 20 and verification device 50 through Internet 80. Second communication unit 73 includes, for example, a wired interface or a wireless interface. The wired interface includes, for example, a wired LAN interface. The wireless interface includes, for example, Bluetooth (registered trademark) or a wireless LAN interface.

Management device 70 includes, for example, a CPU, a ROM, and a RAM. For example, the CPU realizes various types of functions in units within management device 70 by executing a program stored in the ROM.

For example, verification device 50 verifies the validity of a signature attached to electronic data. Verification device 50 includes random number generation unit 51, unidirectional function processing unit 52, signature verification unit 53, authentication processing unit 54, common key encryption unit 55, public key encryption unit 56, common key decryption unit 57, first communication unit 58, second communication unit 59, storage unit 60, and data combining unit 61.

Random number generation unit 51 generates a random number. Random number generation unit 51 may generate a pseudo-random number using, for example, a general pseudo-random number generation algorithm, or may generate a genuine random number using random number generation hardware. Random number generation unit 51 is an example of a second random number generation unit.

Unidirectional function processing unit 52 generates a hash value from various pieces of data (for example, a random number) using, for example, a unidirectional function. Unidirectional function processing unit 52 is an example of a third unidirectional function processing unit.

For example, signature verification unit 53 decrypts data which is encrypted using the secret key of communication device 20 in accordance with a public key algorithm by using the public key of communication device 20. Signature verification unit 53 verifies the signature attached to the electronic data on the basis of the decrypted data. Signature verification unit 53 is an example of a signature verification unit.

Authentication processing unit 54 compares the two pieces of data with each other to thereby authenticate whether or not the two pieces of data conform to each other, and outputs an authentication result. For example, authentication processing unit 54 performs authentication by comparing a certificate acquired from communication device 20 through a secure communication path with a certificate acquired without going through secure communication path 85.

Common key encryption unit 55 encrypts various pieces of data on the basis of a predetermined common key cryptographic algorithm (for example, AES) by using a common key shared with communication device 20. Common key encryption unit 55 is an example of a second data encryption unit.

Public key encryption unit 56 encrypts various pieces of data using the public key of communication device 20. Public key encryption unit 56 is an example of a second data encryption unit.

Common key decryption unit 57 decrypts encrypted data which is transmitted from communication device 20, using a common key shared with communication device 20. Common key decryption unit 57 is an example of a second data decryption unit.

First communication unit 58 communicates with communication device 20. First communication unit 58 includes, for example, a serial I/F or a communication interface. The serial I/F includes, for example, RS-232C. The communication interface includes, for example, a USB or Thunderbolt (registered trademark).

Second communication unit 59 includes an interface for communicating with communication device 20 and management device 70 through Internet 80. Second communication unit 59 includes, for example, a wired interface or a wireless interface. The wired interface includes, for example, a wired LAN interface. The wireless interface includes, for example, Bluetooth (registered trademark) or a wireless LAN interface. Second communication unit 59 is an example of a second communication unit.

Storage unit 60 stores various pieces of data. Storage unit 60 stores, for example, a public key pair of verification device 50, a common key, and the public key of communication device 20. Storage unit 60 is an example of a second storage unit.

Data combining unit 61 combines a plurality of pieces of data with each other.

Verification device 50 includes, for example, a CPU, a ROM, and a RAM. For example, the CPU realizes various types of functions in units within verification device 50 by executing a program stored in the ROM.

In FIG. 1, verification device 50 and management device 70 are configured as separate devices, but may be configured as one device. Management device 70 and verification device 50 are connected to each other by Internet 80, but may be connected to each other through, for example, a LAN.

Next, an example of the operation of signature verification system 10 will be described.

FIGS. 2 to 7 are sequence diagrams illustrating an example of the operation of signature verification system 10. First, the definition of signs used in FIGS. 2 to 7 will be described.

Signs r1 and r2 denote a random number. The random number includes, for example, a pseudo-random number and a genuine random number. For example, a general pseudo-random number generation algorithm or random number generation hardware may be used to generate a random number. Federal information processing standardization (FIPS) 186-2 or national institute of standards and technology (NIST) special publication (SP) 800-90 may be used to generate a random number. American national standards institute (ANSI) X9.31-1998 appendix C may be used to generate a random number sequence.

Sign K denotes a common key. For example, when a common key is generated from a random number, the common key may be created by adding up key lengths using a unidirectional function and a pseudo-random number generator. For example, the half of a random number which serves as a password and the remaining half thereof which serves as a salt may be input to PBKDF2 to thereby generate a common key. PBKDF2 denotes password-based key derivation function 2 (request for comments (RFC) 2898 public key cryptography standards (PKCS) #5 v2).

Sign K_A denotes a public key pair of device A. Device A is communication device 20. Sign K_A[P] denotes a public key in public key pair K_A of device A. Sign K_A[S] denotes a secret key in public key pair K_A of device A.

Sign EK(M) denotes a result of the encryption of plaintext M using common key K. For example, password-based encryption scheme (PBES)1 or PBES2 is used for the encryption.

Sign E2K(M) is written as "E2", as compared to sign EK(M), and thus cryptographic algorithms are identifiably distinguished from each other when the cryptographic algorithms are different from each other. Sign PK_A(M) denotes a result of the encryption of plaintext M using public key K_A[P] of public key pair K_A. For example, a rivest shamir adelman (RSA) cryptogram, diffie-hellman (DH) key exchange, an elgamal cryptogram, or an elliptic curve cryptogram is used for the encryption.

Sign SK_A(M) denotes a result of the encryption of plaintext M using secret key K_A[S] of public key pair K_A.

Sign H(M) denotes a hash value which is a result of the calculation of plaintext M using a unidirectional function. For example, message digest algorithm 5 (MD5), secure hash algorithm (SHA) 1, SHA256, or SHA512 may be used as the unidirectional function.

Sign C_A denotes a certificate of device A.

In the above description, signs used for device A have been illustrated. However, when signs are used for device B in the same manner, the portion "A" which is the above-mentioned sign is appropriately changed to "B".

The operation of signature verification system 10 is performed in the order of a device password registration sequence, a certificate creation sequence, a signature creation sequence, a device authentication sequence, and a signature verification sequence. The device password registration sequence is a sequence for registering a device password. The certificate creation sequence is a sequence for creating a certificate (for example, a self-signature certificate). The signature creation sequence is a sequence for creating a digital signature. The device authentication sequence is a sequence for authenticating the validity of communication device 20. The signature verification sequence is a sequence for authenticating the validity of a digital signature.

In FIGS. 2 to 8, it is assumed that device M is communication device 20 and device V is verification device 50. Device M is an example of device A, and device V is an example of device B.

Figure 2:
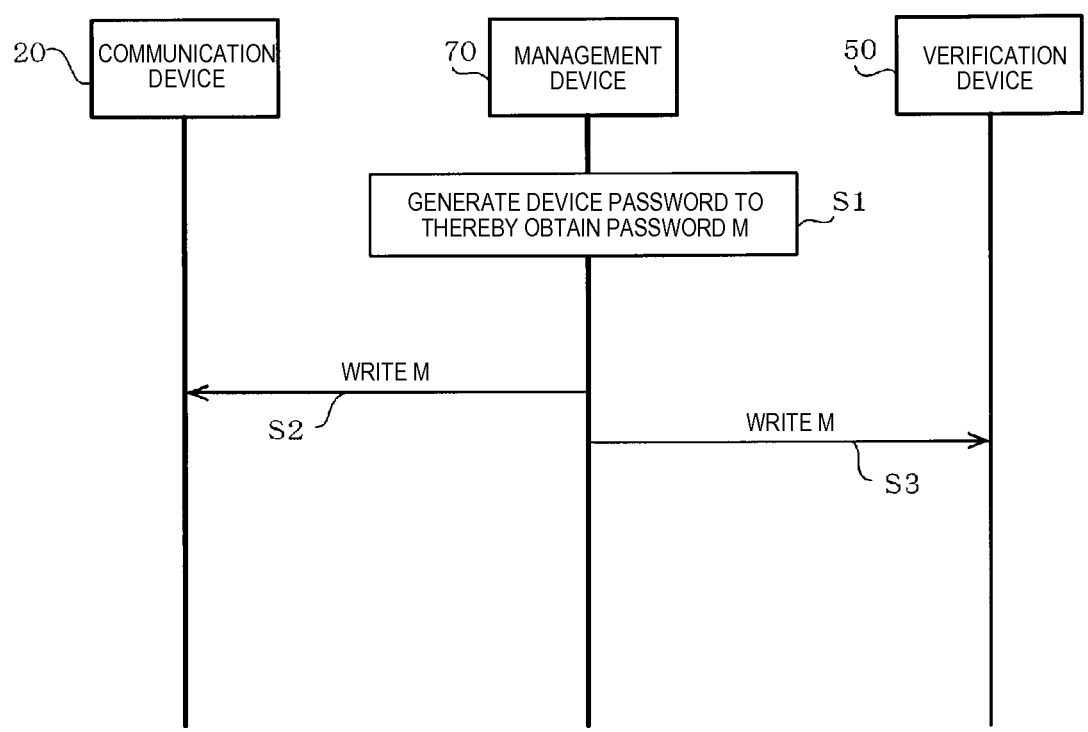
FIG. 2 is a sequence diagram illustrating an example of a device password registration sequence according to the exemplary embodiment.

FIG. 2 is a sequence diagram illustrating an example of a device password registration sequence which is performed by signature verification system 10.

First, in management device 70, device password generation unit 71 generates password M which is a device password, that is, a plaintext (S1).

First communication unit 72 transmits the generated password M to communication device 20 and writes the password in communication device 20 (S2). In other words, in communication device 20, first communication unit 31 receives password M, and storage unit 33 stores password M.

First communication unit 72 transmits the generated password M to verification device 50 and writes the password in verification device 50 (S3). In other words, in verification device 50, first communication unit 58 receives password M, and storage unit 60 stores password M.

When device password generation unit 71 of management device 70 generates a device password, the device password generation unit may generate password M on the basis of, for example, a key derivation function, and may read out password M which is hard-coded in a program code of management device 70.

Either the writing of password M in communication device 20 or the writing of password M in verification device 50 may be performed first, or the order thereof may be reverse to that in the example of FIG. 2. Password M may be written before the device authentication sequence to be described later is performed.

According to the device password registration sequence illustrated in FIG. 2, it is possible to write password M in communication device 20 and verification device 50 and to use password M in the subsequent sequence, for example, in the process of installing communication device 20.

Figure 3:
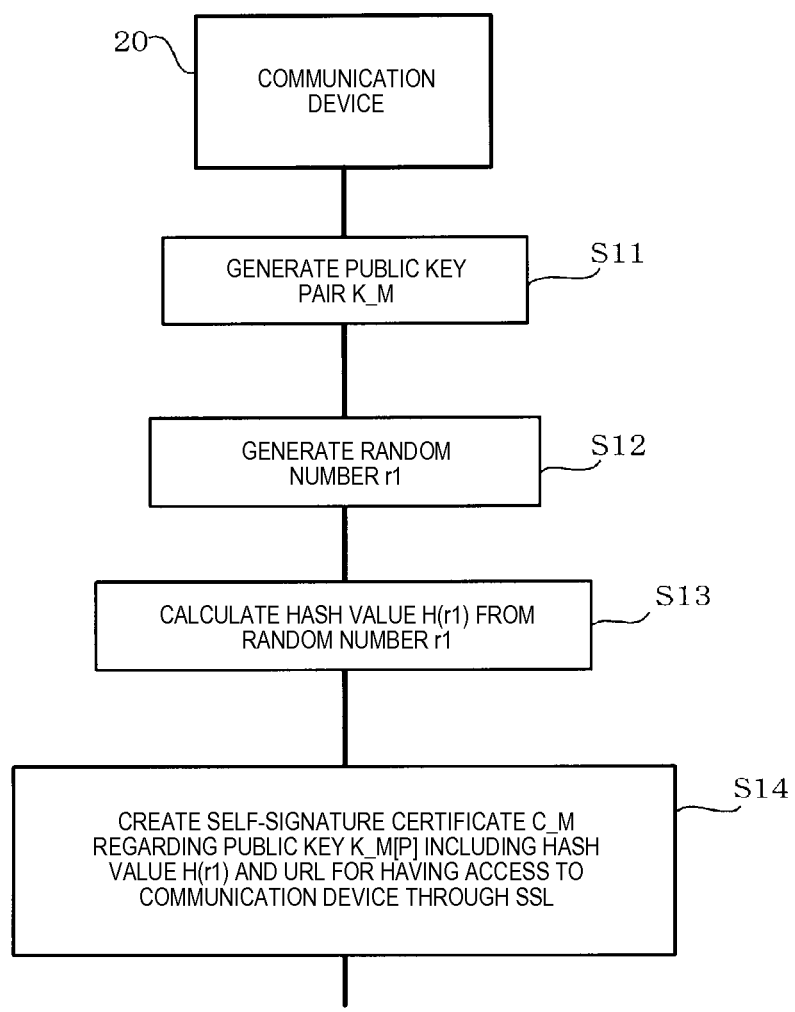
FIG. 3 is a sequence diagram illustrating an example of a certificate creation sequence according to the exemplary embodiment.

FIG. 3 is a sequence diagram illustrating an example of a certificate creation sequence which is performed by signature verification system 10.

The certificate creation sequence is performed by communication device 20.

First, public key pair generation unit 24 generates public key pair K_M of communication device 20 (S11). Random number generation unit 21 generates random number r1 (S12). Random number r1 is an example of a first random number. Unidirectional function processing unit 22 derives (for example, calculates) hash value H(r1) from the generated random number r1 (S13). Hash value (r1) is an example of a first hash value.

Certificate generation unit 23 creates certificate C_M of communication device 20 using public key K_M[P] of communication device 20 (S14). Certificate C_M of communication device 20 is, for example, a self-signature certificate, and is signed using secret key K_M[S] of communication device 20. Certificate C_M of communication device 20 includes, for example, hash value H(r1) and a uniform resource locator (URL) for having access to communication device 20 through a secure sockets layer (SSL).

The certificate creation sequence may be performed before the device password registration sequence illustrated in FIG. 2 is performed. A certificate created by communication device 20 may be a certificate signed by another certificate authority (for example, a certificate authority (CA)), instead of a self-signature certificate. In this case, another certificate authority may not strictly confirm communication device 20, and may be a less reliable certificate authority.

According to the certificate creation sequence illustrated in FIG. 3, it is possible to specify a transmission source of certificate C_M by a verification side (for example, verification device 50) by inserting a hash value which is one of owner information into certificate C_M of communication device 20.

Figure 4:
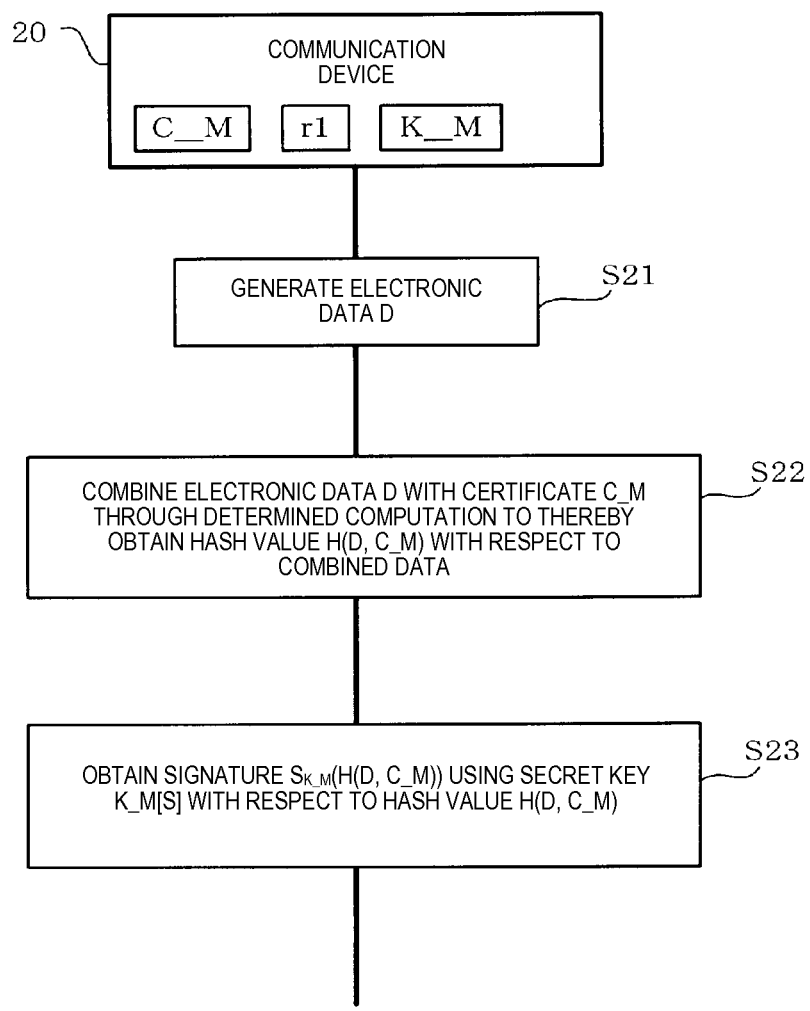
FIG. 4 is a sequence diagram illustrating an example of a signature creation sequence according to the exemplary embodiment.

FIG. 4 is a sequence diagram illustrating an example of a signature creation sequence which is performed by signature verification system 10.

The signature creation sequence is performed by communication device 20. When the signature creation sequence is started, certificate C_M of communication device 20, public key pair K_M of communication device 20, and random number r1 are stored in storage unit 33.

First, electronic data generation unit 28 generates electronic data D (S21). Electronic data D includes, for example, image data and sound data. Electronic data generation unit 28 combines electronic data D with certificate C_M of communication device 20 using a predetermined method (S22). For example, a data combining method of combining electronic data D with certificate C_M of communication device 20 is considered as the predetermined method. Electronic data generation unit 28 may combine information (for example, including a MAC address) for specifying communication device 20, in addition to electronic data D and certificate C_M. Unidirectional function processing unit 22 calculates hash value H(D, C_M) with respect to the combined data (S22). Hash value H(D, C_M) is an example of a second hash value. Signature generation unit 25 generates signature $S_{K\_M}(H(D, C\_M))$ using secret key K_M[S] of communication device 20 with respect to hash value H(D, C_M) (S23).

According to the signature creation sequence illustrated in FIG. 4, a hash value is derived from a combination of electronic data D and certificate C_M, and a signature is attached to the hash value. Accordingly, the verification side can verify the validity of certificate C_M by verifying the signature and can verify whether or not electronic data D has been altered.

Figure 5:
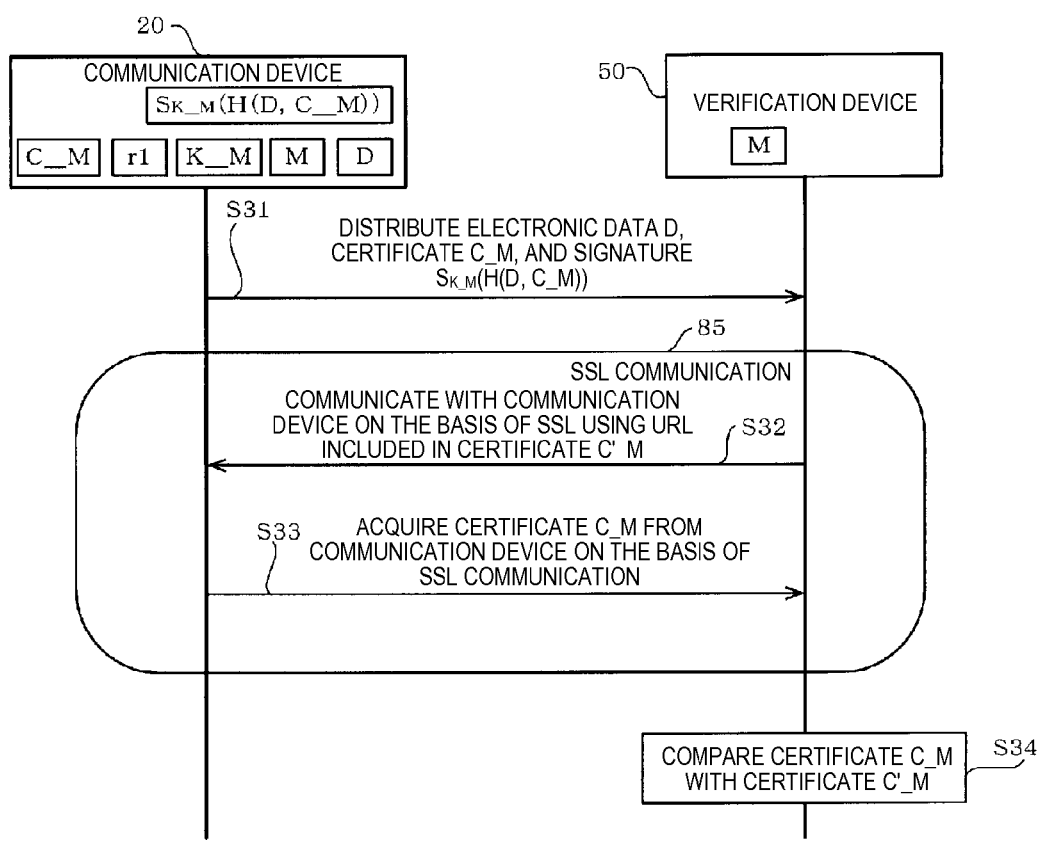
FIG. 5 is a sequence diagram illustrating an example of a device authentication sequence according to the exemplary embodiment.
Figure 6:
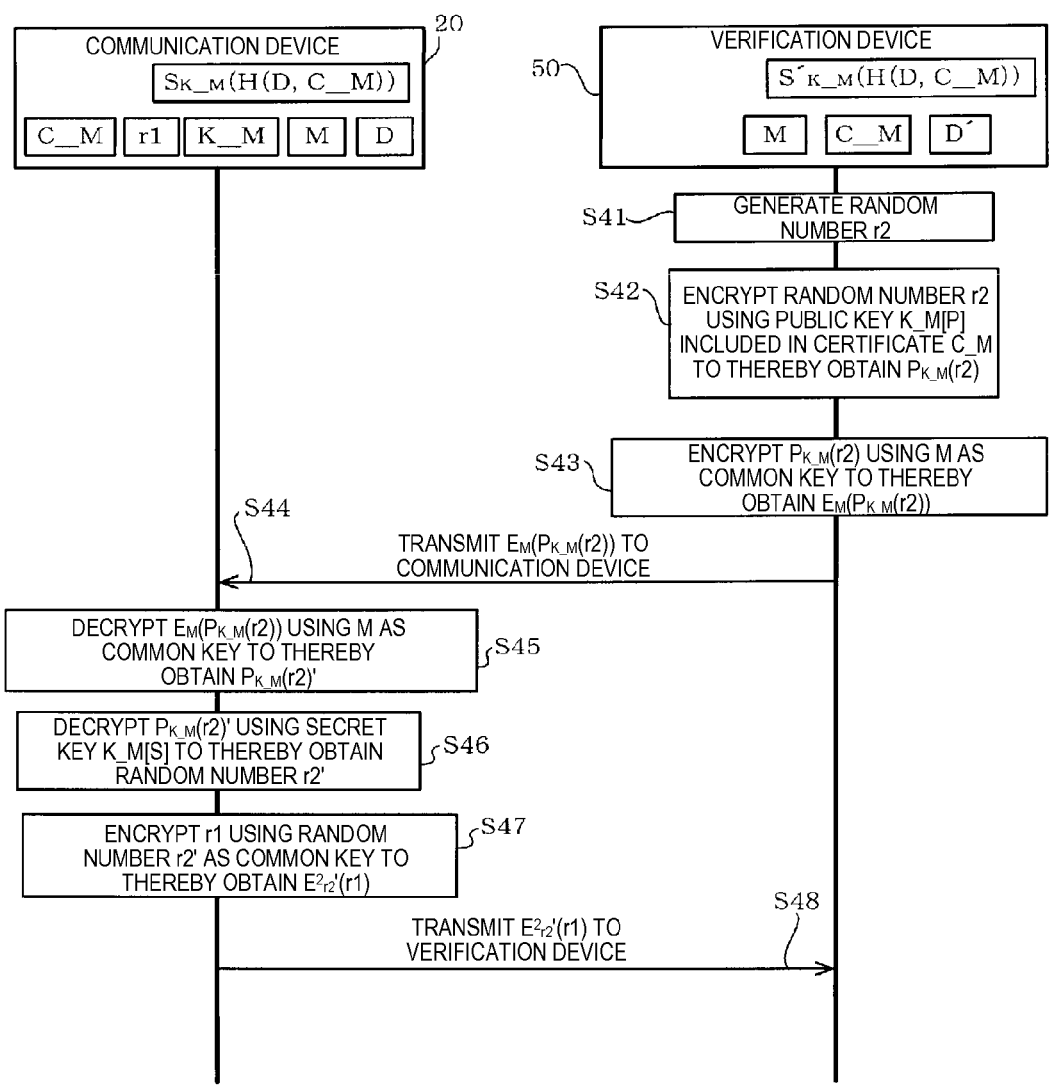
FIG. 6 is a sequence diagram illustrating an example of the device authentication sequence according to the exemplary embodiment (continuation of FIG. 5)
Figure 7:
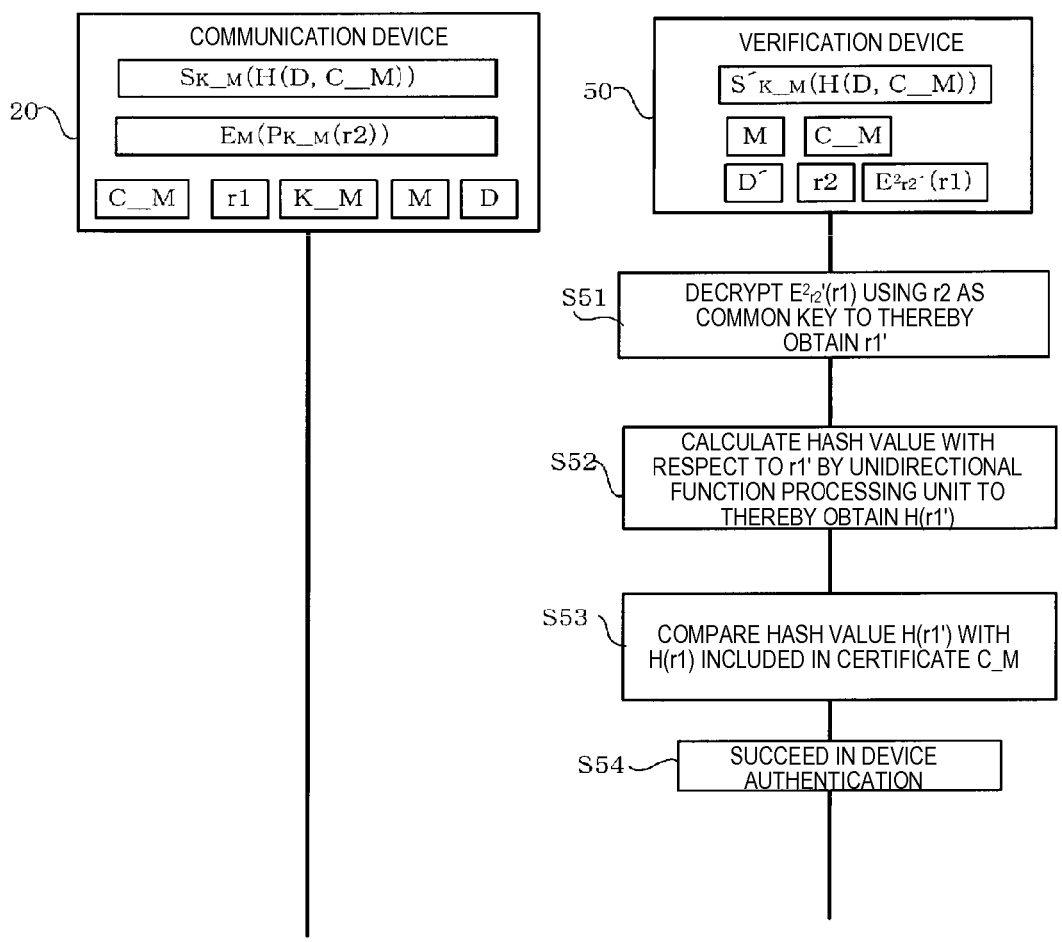
FIG. 7 is a sequence diagram illustrating an example of the device authentication sequence according to the exemplary embodiment (continuation of FIG. 6)

FIGS. 5 to 7 are sequence diagrams illustrating an example of a device authentication sequence which is performed by signature verification system 10. When the device authentication sequence is started, certificate C_M of communication device 20, public key pair K_M of communication device 20, random number r1, password M, signature $S_{K\_M}(H(D, C\_M))$, and electronic data D are stored in storage unit 33 of communication device 20. Password M is stored in storage unit 60 of verification device 50.

In communication device 20, second communication unit 32 transmits (distributes) electronic data D, certificate C_M of communication device 20, and signature $S_{K\_M}(H(D, C\_M))$ to verification device 50 (S31).

In verification device 50, second communication unit 59 receives electronic data D', certificate C_M of communication device 20, and signature $S'_{K\_M}(H(D, C\_M))$ (S31). The received data is stored in, for example, storage unit 60.

The attachment of "'" to a sign indicating each data represents that it is not clear whether or not each data (for example, electronic data D', certificate C'_M, and signature $S'_{K\_M}(H(D, C\_M))$ is regular information (the same applies hereinafter).

Second communication unit 59 establishes secure communication path 85 which is encrypted on the basis of, for example, an SSL between the second communication unit and second communication unit 32 of communication device 20. Second communication unit 59 communicates with communication device 20 on the basis of an SSL using a URL for having access to communication device 20, by using secure communication path 85 (S32). The URL is included in, for example, certificate C'_M of communication device 20. The SSL is an example of secure communication path 85, and a secure communication path other than the SSL may be used.

In communication device 20, second communication unit 32 transmits certificate C_M of communication device 20 through the established SSL. In verification device 50, second communication unit 59 receives certificate C_M from communication device 20 through the established SSL (S33). Certificate C_M acquired in S33 is a regular certificate of communication device 20. Received certificate C_M of communication device 20 is stored in, for example, storage unit 60.

In verification device 50, authentication processing unit 54 compares certificate C_M received in S33 through secure communication path 85 with certificate C'_M received in S31 without going through secure communication path 85, and determines whether or not both the certificates conform to each other (S34).

When both the certificates do not conform to each other, authentication processing unit 54 determines that the authentication of certificate C_M of communication device 20, that is, the authentication of communication device 20, has failed, and terminates the device authentication sequence. On the other hand, when both the certificates conform to each other, authentication processing unit 54 determines that certificate C'_M of communication device 20 which is received in S31 is a regular certificate, and continues the device authentication sequence. Subsequently, the sequence proceeds to FIG. 6.

When the sequence illustrated in FIG. 6 is started, certificate C_M of communication device 20, public key pair K_M of communication device 20, random number r1, password M, signature $S_{K\_M}(H(D, C\_M))$, and electronic data D are stored in storage unit 33 of communication device 20. Password M, certificate C_M of communication device 20, electronic data D', and signature $S'_{K\_M}(H(D, C\_M))$ are stored in storage unit 60 of verification device 50.

In verification device 50, random number generation unit 51 generates random number r2 (S41). Random number r2 is an example of a second random number. Public key encryption unit 56 encrypts random number r2 using public key K_M[P] of communication device 20 to thereby obtain encrypted random number $P_{K\_M}(r2)$ (S42). Public key K_M [P] of communication device 20 is included in certificate C_M of communication device 20.

Common key encryption unit 55 encrypts encrypted random number $P_{K\_M}(r2)$ using password M as a common key to thereby obtain double encrypted random number $E_M(P_{K\_M}(r2))$ (S43). Second communication unit 59 transmits double encrypted random number $E_M(P_{K\_M}(r2))$ to communication device 20 (S44).

In communication device 20, second communication unit 32 receives double encrypted random number $E_M(P_{K\_M}(r2))$ from communication device 20. Common key decryption unit 27 decrypts double encrypted random number $E_M(P_{K\_M}(r2))$ using password M as a common key to thereby obtain encrypted random number $P_{K\_M}(r2)'$ (S45). Secret key decryption unit 30 decrypts encrypted random number $P_{K\_M}(r2)'$ using secret key K_M[S] to thereby obtain random number r2' (S46).

Common key encryption unit 29 encrypts random number r1 using random number r2' as a common key to thereby obtain encrypted random number $E^2_{r2'}(r1)$ (S47). Second communication unit 32 transmits encrypted random number $E^2_{r2'}(r1)$ to verification device 50 (S48).

In verification device 50, second communication unit 59 receives encrypted random number $E^2_{r2'}(r1)$ from communication device 20. Subsequently, the sequence proceeds to FIG. 7.

When the sequence illustrated in FIG. 7 is started, certificate C_M of communication device 20, public key pair K_M of communication device 20, random number r1, password M, signature $S_{K\_M}(H(D, C\_M))$, electronic data D, and double encrypted random number $E_M(P_{K\_M}(r2))$ are stored in storage unit 33 of communication device 20. Password M, certificate C_M of communication device 20, electronic data D', signature $S'_{K\_M}(H(D, C\_M))$, random number r2, and encrypted random number $E^2_{r2'}(r1)$ are stored in storage unit 60 of verification device 50.

In verification device 50, common key encryption unit 55 decrypts encrypted random number $E^2_{r2'}(r1)$ using random number r2 as a common key to thereby obtain random number r1' (S51). Unidirectional function processing unit 52 calculates and obtains hash value H(r1') from random number r1' (S52).

Authentication processing unit 54 compares hash value H(r1') obtained by the calculation with hash value H(r1) included in certificate C_M of communication device 20 and determines whether or not both the hash values conform to each other (S53).

When both the hash values do not conform to each other, authentication processing unit 54 determines that the authentication of communication device 20 has failed, and verification device 50 terminates the device authentication sequence. On the other hand, when both the hash values conform to each other, authentication processing unit 54 determines that the authentication of communication device 20 has succeeded (S54).

According to the device authentication sequence illustrated in FIGS. 5 to 7, it is possible to verify the validity of communication device 20 according to whether or not certificate C_M and certificate C_M' conform to each other. In addition, it is possible to verify the validity of communication device 20 using hash values H(r1) and H(r1') of random number r1 and random number r1. Since hash value H(r1) cannot be identified by an intermediator which is present between communication device 20 and verification device 50, it is possible to improve the verification accuracy of the validity of communication device 20.

Since random numbers r1 and r2 can be generated in a short period of time, it is possible to reduce time required for the device authentication sequence. Since the values of random numbers r1 and r2 change whenever the random numbers are generated, it is possible to improve resistance to a reply attack.

Figure 8:
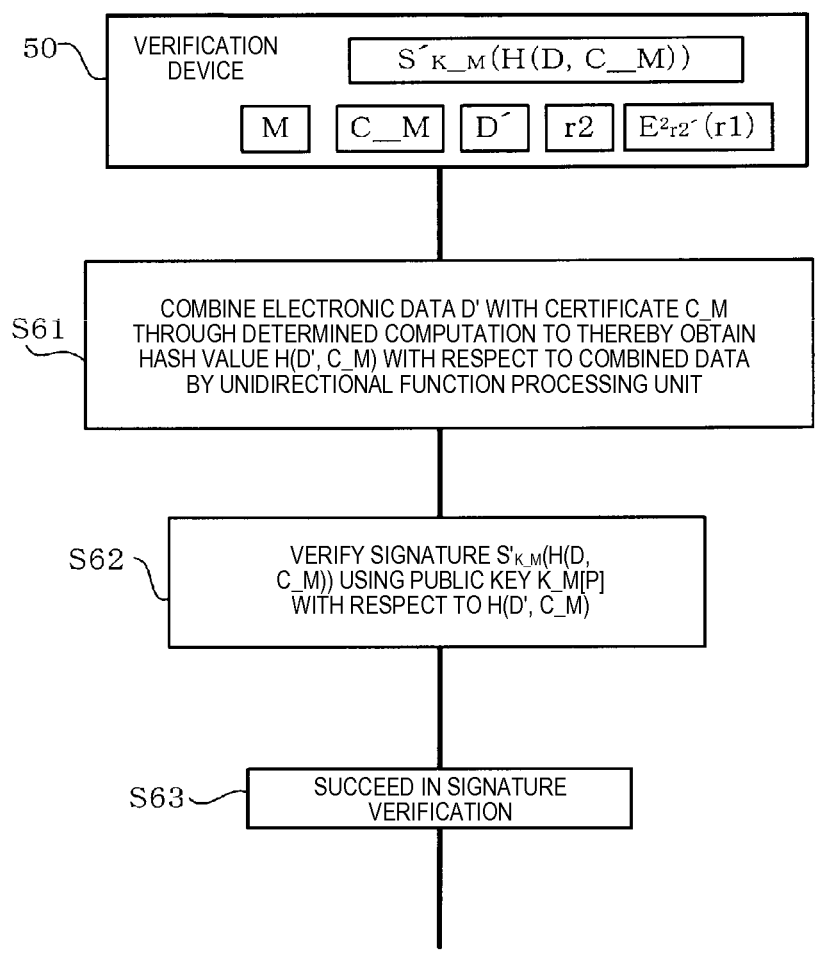
FIG. 8 is a sequence diagram illustrating an example of a signature verification sequence according to the exemplary embodiment.

FIG. 8 is a sequence diagram illustrating an example of a signature verification sequence which is performed by signature verification system 10.

The signature verification sequence is performed by verification device 50. When the signature verification sequence is started, password M, certificate C_M of communication device 20, electronic data D', signature $S'_{K\_M}(H(D, C\_M))$, random number r2, and encrypted random number $E^2_{r2'}(r1)$ are stored in storage unit 60 of verification device 50.

In verification device 50, data combining unit 61 combines electronic data D' with certificate C_M of communication device 20 using a predetermined method (S61). For example, a data combining method of combining electronic data D with certificate C_M of communication device 20 is considered as the predetermined method. Data combining unit 61 may combine information (for example, including a MAC address) for specifying communication device 20, in addition to electronic data D and certificate C_M of communication device 20. Unidirectional function processing unit 52 calculates hash value H(D', C_M) with respect to the combined data (S61).

Signature verification unit 53 verifies signature S'$_{K\_M}$(H (D, C_M)) received in S31, using public key K_M[P] of communication device 20 (S62). Here, signature verification unit 53 decrypts signature S'$_{K\_M}$(H(D, C_M)) using public key K_M[P] of communication device 20 to thereby obtain hash value H(D, C_M). Signature verification unit 53 determines whether or not the decrypted hash value H(D, C_M) and hash value H(D', C_M) calculated in S61 conform to each other.

When both the hash values do not conform to each other, signature verification unit 53 determines that electronic data D has been altered, and terminates the signature verification sequence. On the other hand, when both the hash values conform to each other, signature verification unit 53 determines that the signature verification has succeeded (S63).

According to the signature verification sequence illustrated in FIG. 8, verification device 50 derives a hash value based on electronic data D' which is acquired from communication device 20, using the same method as the method of deriving a hash value based on electronic data D which is performed by communication device 20 illustrated in FIG. 4. Verification device 50 verifies a signature on the basis of whether or not the derived hash value conforms to a hash value which is decrypted from the signature generated by communication device 20.

Thereby, verification device 50 can verify the validity of the creator of the signature and can verify whether or not electronic data D' has been altered in accordance with the validity of the signature. When the device authentication sequence and the signature verification sequence are performed in combination with each other, it is possible to verify the validity of a device and to further improve safety in communication of electronic data.

According to signature verification system 10, even when a signature is written by a device with a relatively low reliability (for example, communication device 20 itself), it is possible to verify the signature between two devices (for example, communication device 20 and verification device 50) and to improve the reliability of a certificate having a signature attached thereto. Thereby, it is possible to verify whether or not electronic data has been altered.

Accordingly, even when a certificate having a signature attached thereto is not issued by a certificate authority which is reliable as a third party, it is possible to reduce the cost and processing time required for the verification of the signature. In this manner, it is possible to easily verify the validity of a signature attached to electronic data at a low cost.

Although various embodiments have been described with reference to the drawings, it is needless to say that the present invention is not limited to such examples. It is obvious to those skilled in the art that various changed or modified examples can be made within the scope described in claims, and it is understood that these examples still fall within the technical scope of the present invention.

For example, in the above-described exemplary embodiment, signature verification system 10 may verify a signature using a random number including a random number sequence and identification information of communication device 20. In this case, random number generation unit 21 generates the random number sequence and generates a random number by combining the random number sequence with identification information of communication device 20. Thereby, even when the same random number sequence is generated, it is possible to uniquely identify random numbers by different pieces of identification information of communication device 20. In other words, it is possible to easily generate a random number with high identification accuracy. The identification information of communication device 20 includes, for example, a serial number of communication device 20 and a media access control (MAC) address of communication device 20.

The present invention is useful for a signature verification system, a communication device, a verification device, a signature generation method, a signature verification method, and the like which are capable of verifying the validity of a signature attached to electronic data at a low cost.

What is claimed is:

1. A signature verification system comprising:
a communication device; and
a verification device which provides verification of a signature generated by the communication device,
wherein the communication device and the verification device are connected to each other through a network,
wherein the communication device includes:
a first processor, and
a first memory including instructions that, when executed by the first processor, cause the first processor to perform first operations, including:
generating a first random number or acquiring a first random number from random number veneration hardware,
deriving a first hash value from the first random number using a unidirectional function,
generating a secret key and a public key of the communication device,
deriving a second hash value from a first combined data including first electronic data and a first certificate of the communication device, the first certificate of the communication device includes the first hash value, the public key of the communication device and an access information for having access to the communication device, using a unidirectional function,
generating a first signature using the secret key of the communication device with respect to the second hash value, and
transmitting the first electronic data, the first certificate and the first signature to the verification device occurs via a non-secure communication path, and
wherein the verification device includes:
a second processor; and
a second memory, including instructions that, when executed by the second processor, cause the second processor to perform second operations, including:
receiving a second electronic data, a second certificate and a second signature,
receiving the first certificate based on the access information,
comparing the second certificate with the first certificate, and
when the second certificate does no match the tint certificate, the second operations, further including:
discontinuing the verification of the signature generated by the communication device, and
when the second certificate matches the first certificate, the second operations, further including:
continuing the verification of the signature generated by the communication device.

2. The signature verification system of claim 1,
wherein when the second certificate matches the first certificate, the second operations, further including:
generating a second random number or acquiring a first random number from random number generation hardware, and
generating first encrypted transmit data using the second random number and the public key of the communication device included with the first certificate, and
transmitting the first encrypted transmit data to the communication device,
wherein the first operations, further including:
receiving a first encrypted receive data from the verification device,
acquiring a decrypted second random number by decrypting the first encrypted receive data rising the secret key of the communication device,
generating second encrypted transmit data using the first random number and the decrypted second random number, and
transmitting the second encrypted transmit data to the verification device, and
the second operations, further including:
receiving a second encrypted receive data,
acquiring a decrypted first random number by decrypting the second encrypted receive data using the second random number,
deriving a derived first hash value from the first random number, and
comparing the derived first hash value with the first hash value included with the first certificate received from the communication device, and
when the derived first hash value does not match the first hash value received, the second operations, further including:
discontinuing the verification of the signature generated by the communication device, and
when the derived first bash value matches the first hash value received, the second operations, further including:
continuing the verification of the signature generated by the communication device.

3. The signature verification system of claim 2,
wherein the communication device includes a first storage unit that stores a common key shared by the communication device and the verification device,
wherein the verification device includes a second storage unit that stores the common key, and
the second operations further including;
generating the first encrypted transmit data using the second random number, the public key of the communication device included with the first certificate, and the common key, and
the first operations, further including:
acquiring the decrypted second random number by decrypting the first encrypted receive data using the secret key of the communication device and the common key.

4. The signature verification system of claim 2, the second operations further including:
deriving a third hash value from the second combined data including the first electronic data and the first certificate of the communication device, using a unidirectional function,
deriving a fourth hash value by decrypting the second signature using the public key of the communication device included with the first certificate of the communication device,
comparing the third hash value with the fourth hash value, and
when the third hash value does not match the fourth hash value, the second operations further including:
discontinuing the verification of the signature generated by the communication device, and
when file third hash value matches with the fourth hash value, the second operations further including:
continuing the verification of the signature generated by the communication device.

5. The signature verification system of claim 1, wherein the network includes a secure communication path and a non-secure communication path.

6. The signature verification system of claim 5, wherein receiving the second electronic data, the second certificate and the second signature by the verification device occurs via the non-secure communication path.

7. The signature verification system of claim 2, wherein the second encrypted transmit data is non-secure second encrypted transmit data.

8. The signature verification system of claim 2, wherein the second encrypted receive data is non-secure second encrypted receive data.

9. A signature generation method in a communication device which is connectable to a verification device through a network and the verification device provides through the network, verification of a signature generated by the communication device, the signature generation method comprising:
the communication device perforating first operations, including:
generating a first random number or acquiring a first random number from random number generation hardware,
deriving a first hash value from the first random number using a unidirectional function,
generating a secret key and a public key of the communication device,
deriving a second hash value from a first combined data including first electronic data and a first certificate of the communication device, the first certificate of the communication device includes the first hash value, the public key of the communication device and an access information for having access to the communication device, using a unidirectional function,
generating a first signature using the secret key of the communication device with respect to the second hash value, and
transmitting the first electronic data, the first certificate and the first signature to the verification device occurs via a non-secure communication path, and
the verification device performing second operations, including:
receiving a second electronic data, a second certificate and a second signature,
receiving the first certificate based on the access information,
comparing the second certificate with the first certificate, and
when the second certificate does not match the first certificate, the second operations, further including:
discontinuing the verification of the signature generated by the communication device, and when the second certificate matches the first certificate, the second operations, further including;
continuing the verification of the signature generated by the communication device.

10. A machine readable non-transitory storage media comprising;
at least one storage medium having stored thereon instructions that, when executed by a communication device which is connectable to a verification device through a network and the verification device provides through the network, verification of a signature generated by die communication device, cause the communication device to perform first operations, including:
generating a first random number or acquiring a first random number from random number generation hardware,
deriving a first hash value from the first random number using a unidirectional function,
generating a secret key and a public key of me communication device,
deriving a second hash value from a first combined data including first electronic data and a first certificate of the communication device, the first certificate of the communication device includes the first hash value, the public key of the communication device and an access information tor having access to the communication device, using a unidirectional function,
generating a first signature using the secret key of the communication device with respect to the second hash value, and
transmitting the first electronic data, the first certificate and the first signature to the verification device occurs via a non-secure communication path; and
another storage medium having stored thereon instructions that, when executed by the verification device, cause the verification device to perform second operations, inducting:
receiving a second electronic data, a second certificate and a second signature,
receiving the first certificate based on the access information,
comparing the second certificate with the first certificate, and
when the second certificate does not match the first certificate, the second operations, further including:
discontinuing the verification of the signature generated by the communication device, and
when the second certificate matches the first certificate, the second operations, further including:
continuing the verification of the signature generated by the communication device.

* * * * *